(12) United States Patent
Adstedt et al.

(10) Patent No.: US 8,368,539 B2
(45) Date of Patent: Feb. 5, 2013

(54) BEVERAGE CONTAINER AUTHENTICITY AND PROVENANCE DEVICES AND METHODS

(75) Inventors: Kjell Roland Adstedt, Scottsdale, AZ (US); Joakim Alexander Sternberg, Edina, MN (US)

(73) Assignee: Left Bank Ventures, LLC, Minneapolis, MN (US)

( * ) Notice: Subject to any disclaimer, the term of this patent is extended or adjusted under 35 U.S.C. 154(b) by 0 days.

(21) Appl. No.: 13/071,391

(22) Filed: Mar. 24, 2011

(65) Prior Publication Data

US 2011/0169642 A1     Jul. 14, 2011

Related U.S. Application Data

(63) Continuation of application No. 12/718,890, filed on Mar. 5, 2010, now abandoned, which is a continuation of application No. 11/840,156, filed on Aug. 16, 2007, now abandoned.

(51) Int. Cl.
G08B 13/14     (2006.01)

(52) U.S. Cl. .................. 340/572.1; 340/572.3; 340/572.8

(58) Field of Classification Search ............... 340/572.1, 340/572.3, 572.8
See application file for complete search history.

(56) References Cited

U.S. PATENT DOCUMENTS

| | | | |
|---|---|---|---|
| 5,732,979 A * | 3/1998 | Finke et al. ............. 283/81 |
| 6,050,622 A | 4/2000 | Gustafson | |
| 6,137,413 A | 10/2000 | Ryan, Jr. | |
| 6,226,619 B1 | 5/2001 | Halperin et al. | |
| 6,360,208 B1 | 3/2002 | Ohanian et al. | |
| 6,501,435 B1 * | 12/2002 | King et al. ............. 343/795 |
| 6,520,544 B1 * | 2/2003 | Mitchell et al. ............. 283/70 |
| 6,641,052 B2 * | 11/2003 | Baillod et al. ............. 235/494 |
| 6,794,000 B2 * | 9/2004 | Adams et al. ............. 428/40.1 |
| 6,828,941 B2 | 12/2004 | King et al. | |
| 6,888,509 B2 * | 5/2005 | Atherton ............. 343/718 |
| 6,891,474 B1 | 5/2005 | Fletcher | |
| 6,952,157 B1 | 10/2005 | Stewart et al. | |
| 7,017,807 B2 * | 3/2006 | Kipp et al. ............. 235/385 |
| 7,025,263 B2 | 4/2006 | Kocott | |
| 7,034,689 B2 | 4/2006 | Teplitxky et al. | |
| 7,040,532 B1 | 5/2006 | Taylor | |
| 7,048,179 B2 | 5/2006 | Claessens | |
| 7,061,382 B2 | 6/2006 | Claessens et al. | |
| 7,126,479 B2 | 10/2006 | Claessens | |
| 7,374,102 B2 | 5/2008 | Arnold et al. | |

(Continued)

FOREIGN PATENT DOCUMENTS

| | | |
|---|---|---|
| JP | 2006-0194947 | 7/2006 |
| KR | 20-0252202 | 10/2001 |

OTHER PUBLICATIONS

Non-Final Office Action mailed Jan. 5, 2010, U.S. Appl. No. 11/837,462.

(Continued)

*Primary Examiner* — Jennifer Mehmood
*Assistant Examiner* — Naomi Small
(74) *Attorney, Agent, or Firm* — Eric L. Lane; McKenna Long & Aldridge LLP

(57) ABSTRACT

An RFID label and optional secondary security label ensures the authenticity of a beverage contained in a beverage container. The RFID label cannot be removed without destroying the RFID label or rendering it inoperable. A secondary security label may be placed over the closure of the beverage container to provide a secondary measure against tampering as well as a visual indicator of authenticity. It is placed on a portion of the bottle, a portion of the beverage container's closure, and the RFID label. An attempt to remove the secondary security label will also render the RFID label unusable.

19 Claims, 2 Drawing Sheets

U.S. PATENT DOCUMENTS

| | | |
|---|---|---|
| 7,450,011 B2 * | 11/2008 | Duschek .................... 340/572.8 |
| 7,486,188 B2 | 2/2009 | Van Alstyne |
| 7,701,346 B2 * | 4/2010 | Lindsay et al. ............ 340/572.3 |
| 2002/0135481 A1 * | 9/2002 | Conwell et al. ........... 340/572.1 |
| 2002/0178107 A1 | 11/2002 | Biancavilla |
| 2004/0119593 A1 * | 6/2004 | Kuhns ....................... 340/572.7 |
| 2004/0148117 A1 | 7/2004 | Kirshenbaum et al. |
| 2005/0003839 A1 | 1/2005 | Tripp |
| 2005/0051624 A1 * | 3/2005 | Kipp et al. ..................... 235/385 |
| 2005/0102189 A1 | 5/2005 | Lopez et al. |
| 2005/0144132 A1 | 6/2005 | Lin |
| 2005/0187827 A1 | 8/2005 | Weiss et al. |
| 2005/0248455 A1 | 11/2005 | Pope |
| 2005/0261963 A1 | 11/2005 | McLaughlin et al. |
| 2006/0017571 A1 | 1/2006 | Arnold et al. |
| 2006/0095343 A1 | 5/2006 | Clarke et al. |
| 2006/0113369 A1 | 6/2006 | Taylor |
| 2006/0113370 A1 | 6/2006 | Taylor et al. |
| 2006/0113374 A1 | 6/2006 | Taylor |
| 2006/0120752 A1 | 6/2006 | McVicker et al. |
| 2006/0132311 A1 | 6/2006 | Kruest |
| 2006/0261950 A1 | 11/2006 | Arenson et al. |
| 2006/0290496 A1 | 12/2006 | Peeters |
| 2007/0008121 A1 | 1/2007 | Hart |
| 2007/0050370 A1 | 3/2007 | Denny |
| 2007/0055576 A1 | 3/2007 | Wayman |
| 2007/0069895 A1 | 3/2007 | Koh |
| 2007/0096912 A1 * | 5/2007 | Rajan ........................ 340/572.3 |
| 2007/0118436 A1 | 5/2007 | McDowell et al. |
| 2007/0130090 A1 | 6/2007 | Staib et al. |
| 2007/0139205 A1 * | 6/2007 | Tanaka et al. ............. 340/572.8 |
| 2007/0150369 A1 | 6/2007 | Zivin |
| 2007/0187266 A1 | 8/2007 | Porter et al. |
| 2007/0296599 A1 * | 12/2007 | Wang et al. ................ 340/572.8 |
| 2007/0299743 A1 | 12/2007 | Staib et al. |

OTHER PUBLICATIONS

Final Office Action mailed Sep. 2, 2010, U.S. Appl. No. 11/837,462.
Non-Final Office Action mailed Aug. 2, 2010, U.S. Appl. No. 11/837,465.
Non-Final Office Action mailed Oct. 7, 2009, U.S. Appl. No. 11/840,156.
Non-Final Office Action mailed Sep. 24, 2010, U.S. Appl. No. 12/718,890.
Non-Final Office Action mailed Dec. 11, 2009, U.S. Appl. No. 12/035,803.
Non-Final Office Action mailed Nov. 19, 2010, U.S. Appl. No. 12/813,243.

* cited by examiner

BEVERAGE CONTAINER AUTHENTICITY AND PROVENANCE DEVICES AND METHODS

RELATED APPLICATION

This application is a continuation of and claims the Paris Convention Priority of U.S. Utility patent application Ser. No. 12/718,890, now abandoned which is a continuation of U.S. Utility patent application Ser. No. 11/840,156, filed Aug. 16, 2007 now abandoned, which is hereby incorporated by reference.

BACKGROUND

The present disclosure relates to maintaining the authenticity and preventing of counterfeiting of beverage containers.

SUMMARY

An RFID label and optional secondary security label ensures the authenticity of a beverage contained in a beverage container. The RFID label cannot be removed without destroying the RFID label or rendering it inoperable. The secondary security label may be placed over the closure of the beverage container to provide a secondary measure against tampering, as well as a visual indicator of authenticity. The secondary security label is placed on a portion of the bottle, a portion of the beverage container's closure, and a portion of the RFID label. An attempt to remove the secondary security label will also render the RFID label unusable.

According to a feature of the present disclosure, a device is disclosed comprising an RFID tag permanently affixed to a beverage container. The RFID tag is affixed over a closure of the beverage container and at least a portion of the container. Additionally, the RFID tag is disposed whereby the RFID tag is inactivated upon opening the beverage container or inactivated if it is removed from the beverage container.

According to a feature of the present disclosure, a method is disclosed comprising generating a unique electronic product code, providing an RFID tag that communicates to an RFID reader at least the unique electronic product code, allowing the RFID tag to be affixed to a beverage container such that the RFID tag is inactivated if it is removed from the beverage container or the beverage container is opened.

According to a feature of the present disclosure, a method is disclosed comprising authenticating as genuine a beverage contained in a beverage container and affixing an RFID tag to the bottle. The RFID is inactivated if the beverage container is opened or if the RFID tag is removed.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, biological, electrical, functional, and other changes may be made without departing from the scope of the present invention. The following detailed description is, therefore, not to be taken in a limiting sense, and the scope of the present invention is defined only by the appended claims. As used in the present disclosure, the term "or" shall be understood to be defined as a logical disjunction and shall not indicate an exclusive disjunction unless expressly indicated as such or notated as "xor."

U.S. Utility application Ser. No. 11/837,462 (U.S. Pat. Pub. 2008/0222003), filed 10 Aug. 2007 and U.S. Utility application Ser. No. 11/837,465 (U.S. Pat.Pub. 2008/0217404), filed 10 Aug. 2007, are hereby incorporated by reference herein.

Figure 1:
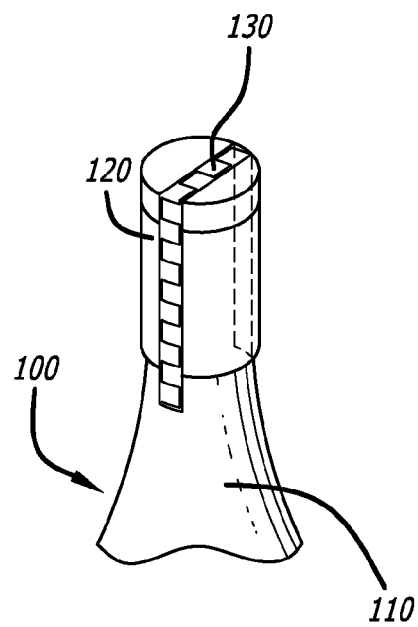
FIG. 1 is a perspective view of an embodiment of a beverage container authenticity and provenance device.

According to embodiments and as illustrated in FIG. 1, there is shown a security and authenticity labeling system to be used on beverage containers 100. Beverage container 100 may comprise containers holding beverages, including bottles of all sizes, such as wine bottles, cans, carafes, and jars. Beverage containers 100 are closed or sealed as would be known to artisans, for example by screw top caps, corks and capsules, can tabs, perforated capsules (e.g., water bottle capsule lids), lids that affix by friction (e.g., the lid on a gallon of milk), etc. According to embodiments, where a bottle is used, capsule 120 is placed over beverage container opening that employ less secure methods of closing, for instance corks. According to embodiments, beverage container 100 is corked after wine is put into beverage container 100; which comprises a wine bottle. After the closing of beverage container 100, capsule 120 is placed over the former opening of beverage container 100, covering the former opening as well as portion of beverage container neck 110. The devices used to close or seal beverage container 100 comprise the closure. For example, closure may comprise a cork and capsule 120. Alternatively, the closure may comprise a screw top or can tab, according to various embodiments.

To ensure authenticity and security and according to embodiments, RFID label 130 is permanently affixed to the closure of beverage container 100. RFID label 130 is also permanently affixed to at least one portion of beverage container 100 or beverage container neck 110. Thus, beverage container 100 cannot be opened without destroying or permanently disabling RFID label 130.

For example, beverage container 100 is a wine bottle. Beverage container 100 is corked at the winery and a capsule is placed over the cork and beverage container neck 110, as known and understood by artisans. RFID label 130 is then permanently affixed to capsule 120 and a portion of beverage container neck 110.

According to embodiments, RFID label 130 is a passive RFID device comprising at least an integrated circuit and an antenna, as known to artisans. RFID label 130 is placed such that it is permanently affixed to a portion of beverage container next 110 and placed onto capsule 120, thereby preventing removal of either the capsule or opening beverage container 100 without causing irreparable damage to RFID label 130. According to embodiments, RFID label is permanently affixed to beverage container neck 110, placed across at least a portion of capsule 120, and to a second portion of beverage container neck 110, thereby preventing opening of beverage container 100 without removal of the capsule.

According to embodiments, suitable adhesives, including epoxy-based adhesives or permanent pressure sensitive adhesives, are used to affix RFID label 130 to beverage container neck 110. Generally, the adhesive used prevents the label from being removed from beverage container 100 without damaging RFID label 130. The same or a different suitable adhesive is used to affix RFID label 130 to capsule 120.

Figure 2:
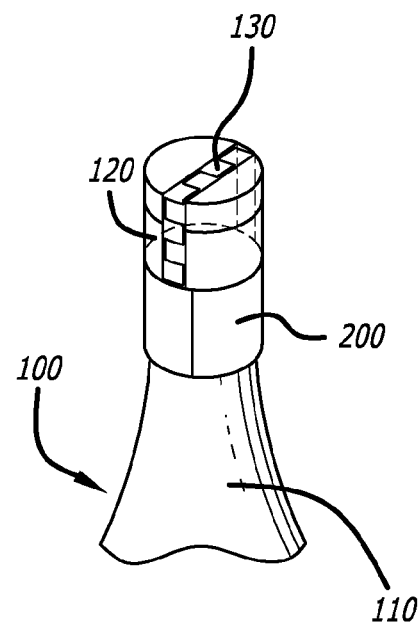
FIG. 2 is a perspective view of an embodiment of a beverage container authenticity and provenance device with a visual security member attached.

According to embodiments and as illustrated in FIG. 2, security label 200 is affixed over the closure, RFID label 130, beverage container neck 110. Placement of security label 200, according to embodiments, prevents access to the edges of the closure, for example the bottom of capsule 120 as illustrated in FIG. 2. Security label 200 adheres to capsule 120, beverage container neck 110, and RFID label 130 via a suitable adhesive such as epoxy based adhesives or permanent pressure sensitive adhesives. According to embodiments, if security label 200 is removed, it will render RFID label 130 inoperative. Accordingly, the adhesive used to secure security label 200 will require more force to remove than the force necessary to cause damage to RFID label 130 upon removal of security label 200. Thus, removal of security label 200 will render RFID label 130 inoperative if it is removed from beverage container 100.

Naturally, the adhesive affixing security label 200 to beverage container 100 will be tamper-resistant, which will prevent removal of security label 200 using heat or chemical agents to degrade the adhesive. Not only will security label 200 render RFID label 130 inoperable upon removal, it also provides a visual confirmation as to whether the beverage container is authentic or whether it has been tampered with, etc.

According to embodiments, security label 200 is made from polyethylene terephthalate (PET) polyester (i.e., Mylar). According to embodiments, the PET selected is treated to make it "no-tear," for example by applying a layer of polyethylene to PET security label 200. PET security label 200 affixes to capsule 120, RFID label 130, and beverage container neck 110 such that the surface of the PET is smooth. If PET security label 200 is removed, it will "crumble" and be unable to be reapplied such that the surface is smooth. Similarly, according to embodiments, an adhesive or chemical agent may be selected and applied under PET security label 200 that changes appearance if tampered with (e.g., heated or chemicals applied), thereby providing visual clues as to whether security label 200 has been tampered with.

According to embodiments, RFID labels 130 may be affixed in other locations. For example, RFID label 130 may be affixed over the top of a cork or within a cork on a wine bottle because the cork must be removed. However, as known in the art, cork are removable without corkscrews; thus, RFID labels 130 affixed to the top or inside of a cork would be able to be removed without rendering RFID label 130 inoperative. PET security label 200 is affixed over cork and neck of bottle, according to embodiments, whereby removal of PET security label provides either the visual indicia of tampering or cannot be replaced in its original smooth conformation, as describe above.

Figure 3:
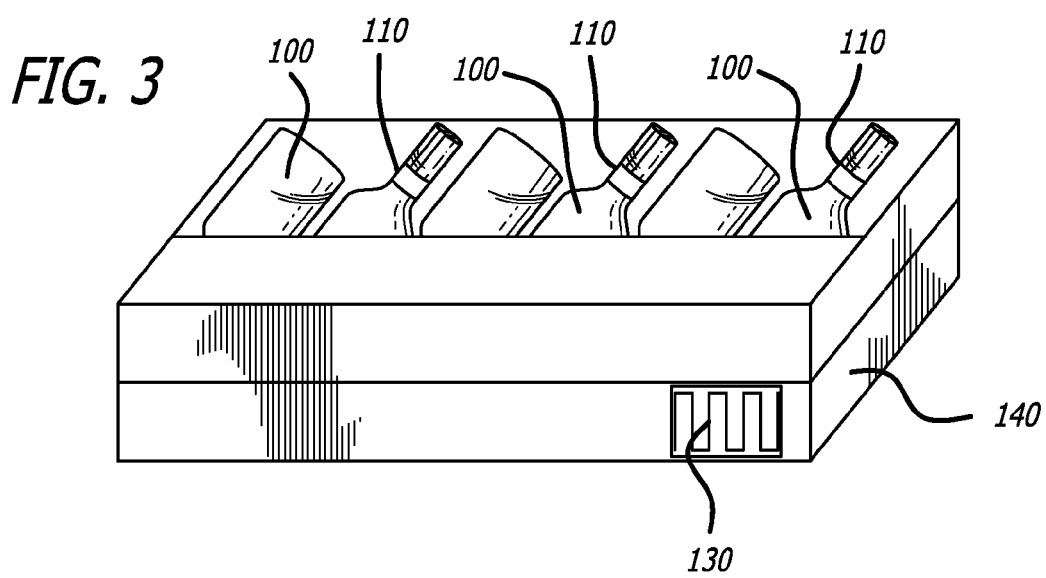
FIG. 3 is a perspective view of an embodiment of a case containing beverage containers having authenticity and provenance devices connected.

According to embodiments and as illustrated in FIG. 3, beverage containers 100 having RFID labels 130 affixed may be packaged in cases 140 for shipment. Each case 140 may have RFID label 130 similarly affixed. Thus, retailers, wholesalers, and consumers can readily determine, based on a correlation of data either stored on RFID label 130 affixed to case 140 or by using the electronic product code embedded in RFID label 130 affixed to case 140 whether the correct individual beverage containers 100 are contained in each case 140. Thus, one can readily determine if tampering has occurred not only with single beverage containers 100, but also by evaluating the contents of each case 140.

Figure 4:
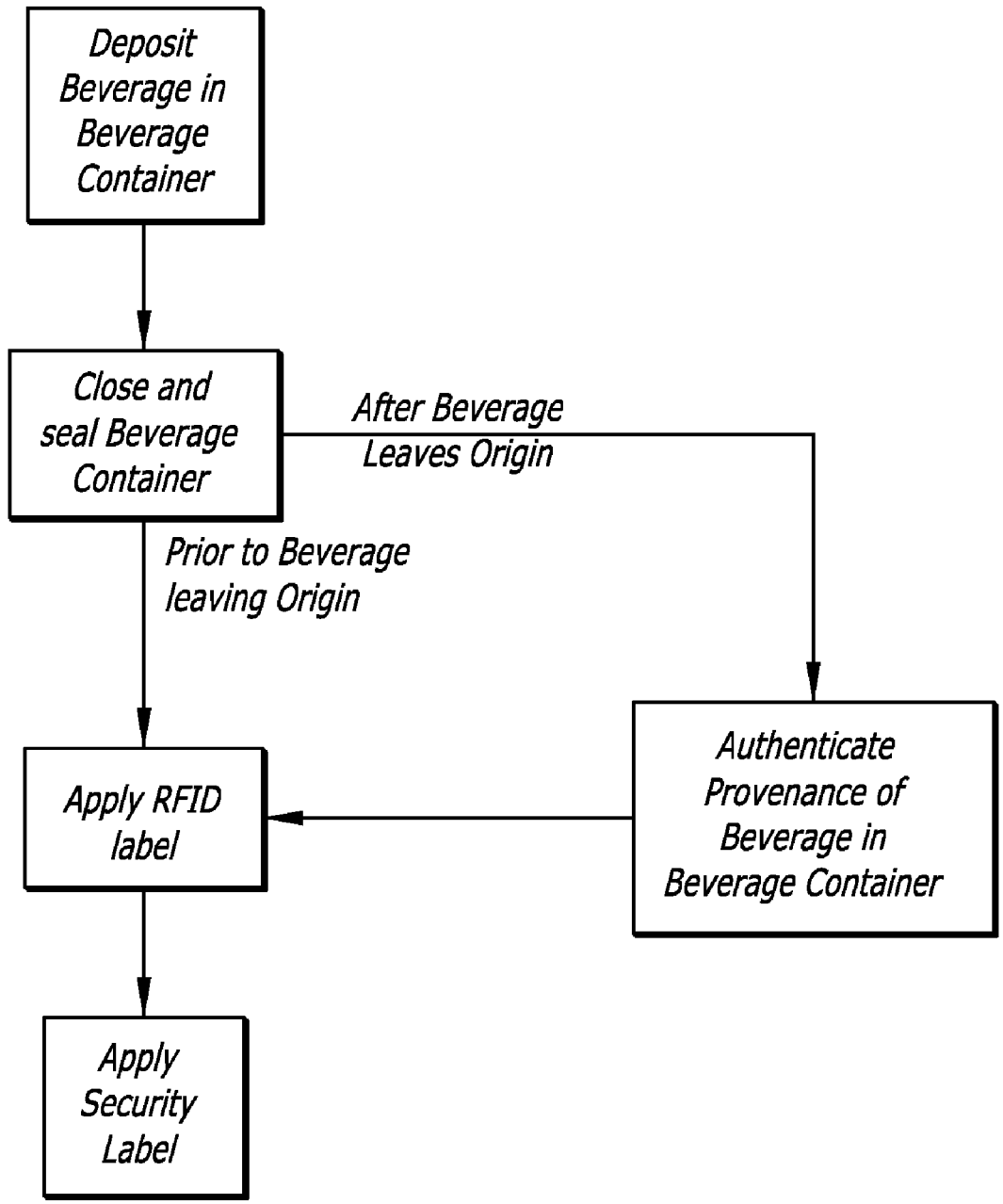
FIG. 4 is a flow diagram of an embodiment of the processes of authentication of application of an RFID label to a beverage container.

The present disclosure discloses methods of providing a tool for ensuring authenticity of beverages contained in beverage containers as illustrated in FIG. 4. According to embodiments, an RFID label is applied to a beverage container to ensure authenticity and provenance of the contents of the beverage container over the course of time. The RFID labels may be applied either at the origin of the beverage or at a later time and location.

Placement of an RFID label and security label, according to embodiments, are applied at the point of origin. After the beverage is deposited in the beverage container in operation 300 and the beverage container is closed and sealed using the closure device in operation 302, the RFID label is applied over the closure and at least a portion of the beverage container in operations 320, as described in detail above. Optionally, according to embodiments, security label is applied over at least a portion of the RFID label in operation 322, as described in detail above. An adhesive is used to ensure the RFID label and security label cannot be removed without destroying or rendering inoperable the RFID label, according to embodiments. Thus, the closure cannot be removed without destroying the RFID label, and the RFID label cannot be removed without destroying it. Moreover, the RFID label cannot be easily removed and applied to counterfeit beverages. According to similar embodiments, security label changes appearance if removed or tampered with.

Placement of an RFID label, and optionally a security label, may be applied after the beverage has departed from its point of origin, according to embodiments. Prior to applying the RFID label, the beverage contained in the beverage container is authenticated in operation 310. Thereafter, the RFID label and security labels are applied in operations 320, 322.

For example, an aged wine originated prior to the advent of RFID technologies. According to embodiments, an expert authenticates the aged bottle of wine as genuine, after which an RFID label is applied as disclosed herein. Thus, after a particular beverage is deemed to be authentic, the RFID label provides continuing assurance that the particular bottle is genuine, as well as records provenance data from that point on.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:
1. A device comprising:
an RFID tag permanently affixed to a beverage container, wherein the RFID tag is affixed over a closure of the beverage container and at least a portion of the container, the RFID tag being directly rendered inoperable when subject to a first level of force; and a security label affixed over at least a portion of the RFID tag with an adhesive, whereby the RFID tag is directly inactivated by removal of the security label, the adhesive requiring a second level of force to remove, the second level of force being greater than the first level of force;

wherein the RFID tag is disposed whereby the RFID tag is inactivated upon opening the beverage container; and wherein the RFID tag is inactivated if it is removed from the beverage container.

2. The device of claim 1, wherein a chemical agent associated with the security label in a first visual appearance assumes a second visual appearance if the security label is tampered with or removed.

3. The device of claim 1, wherein the beverage container is a wine bottle.

4. The device of claim 1, wherein the RFID tag covers a portion of the beverage container in at least two locations to prevent removal of the closure without inactivation of the RFID tag.

5. The device of claim 4, wherein the closure is a capsule of a wine bottle.

6. A method comprising:
generating a unique electronic product code;
providing an RFID tag that communicates to an RFID reader at least the unique electronic product code, the RFID tag being directly rendered inoperable when subject to a first level of force;
allowing the RFID tag to be affixed to a beverage container such that the RFID tag is inactivated if it is removed from the beverage container or the beverage container is opened;
providing a security label affixed over at least a portion of the RFID tag with an adhesive;
allowing the RFID tag to be directly inactivated by removal of the security label, the adhesive requiring a second level of force to remove, the second level of force being greater than the first level of force; and
wherein at least provenance data is correlated with the electronic product code and the specific beverage container.

7. The method of claim 6, wherein the beverage container is a wine bottle.

8. The method of claim 6, wherein the electronic product code is correlated to the specific beverage container to which it is affixed.

9. The method of claim 6, wherein the RFID tag is affixed at the origin of the beverage container.

10. The method of claim 6, wherein the RFID tag is affixed after the authenticity of the beverage and beverage container are determined.

11. The method of claim 6, further comprising allowing a security label to be affixed over at least a portion of the RFID tag, whereby the RFID tag is inactivated if the security label is removed.

12. The method of claim 6, further comprising allowing a security label to be affixed over at least a portion of the RFID tag, whereby the security label or a chemical agent associated with the security label in a first visual appearance assumes a second visual appearance if the security label is tampered with or removed.

13. A method comprising:
authenticating as genuine a beverage contained in a beverage container; and
affixing an RFID tag to the bottle, whereby the RFID is inactivated if the beverage container is opened or if the RFID tag is removed, the RFID tag being directly rendered inoperable when subject to a first level of force;
providing a security label affixed over at least a portion of the RFID tag with an adhesive; and
allowing the RFID tag to be directly inactivated by removal of the security label, the adhesive requiring a second level of force to remove, the second level of force being greater than the first level of force;
wherein the beverage is wine and the beverage container is a wine bottle.

14. The method of claim 13, wherein the authentication process comprises filling the beverage container with the beverage and closing the container.

15. The method of claim 13, wherein the authentication process comprises a determination of the authenticity of the beverage contained in the beverage container after the beverage container is filled with the beverage and the container is closed.

16. The method of claim 13, wherein a security label is affixed to the RFID tag and at least one of the beverage container and a closure device, whereby the RFID tag is inactivated if the security label is removed.

17. The method of claim 16, wherein the security label is placed at least around a circumference of an outer surface of the closure and around a circumference of an outer surface of the beverage container.

18. The method of claim 17, wherein the beverage container is a wine bottle and the closure is a capsule.

19. The method of claim 13, further comprising a security label affixed over at least a portion of the RFID tag, whereby the security label or a chemical agent associated with the security label in a first visual appearance assumes a second visual appearance if the security label is tampered with or removed.

* * * * *